(12) United States Patent
Dockemeyer et al.

(10) Patent No.: US 7,633,998 B2
(45) Date of Patent: Dec. 15, 2009

(54) WIRELESS HOME REPEATER FOR SATELLITE RADIO PRODUCTS

(75) Inventors: Joseph R. Dockemeyer, Kokomo, IN (US); Daniel W. Farrow, Noblesville, IN (US); William R. Livengood, Grand Blanc, MI (US); Daniel G. Morris, Ovid, MI (US); Korkut Yegin, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 607 days.

(21) Appl. No.: 11/304,006

(22) Filed: Dec. 15, 2005

(65) Prior Publication Data

US 2006/0133465 A1 Jun. 22, 2006

Related U.S. Application Data

(60) Provisional application No. 60/638,064, filed on Dec. 21, 2004.

(51) Int. Cl.
*H04B 1/38* (2006.01)

(52) U.S. Cl. ............... 375/220; 375/211; 375/219; 375/295; 375/316; 455/11.1; 455/13.1; 455/402; 455/428; 342/12; 342/356; 342/382

(58) Field of Classification Search ........ 375/257, 375/130, 135–137, 144–147, 211–212, 226–228, 375/260, 355–371, 219–222; 455/6.1, 14, 455/428, 502, 552; 342/12, 356, 382
See application file for complete search history.

(56) References Cited

U.S. PATENT DOCUMENTS

| | | | |
|---|---|---|---|
| 4,218,685 A | 8/1980 | Frosch et al. | 343/727 |
| 4,442,438 A | 4/1984 | Siwiak et al. | 343/792 |
| 4,466,003 A | 8/1984 | Royce | 343/826 |
| 4,730,195 A | 3/1988 | Phillips et al. | 343/792 |
| 5,161,255 A | 11/1992 | Tsuchiya | 455/345 |
| 5,264,862 A | 11/1993 | Kumpfbeck | 343/853 |
| 5,317,327 A | 5/1994 | Piole | 343/725 |
| 5,440,317 A | 8/1995 | Jalloul et al. | 343/791 |
| 5,600,341 A | 2/1997 | Thill et al. | 343/895 |
| 5,923,305 A | 7/1999 | Sadler et al. | 343/895 |
| 6,069,588 A | 5/2000 | O'Neill, Jr. | 343/713 |

(Continued)

FOREIGN PATENT DOCUMENTS

EP 0 957 533 A1 11/1999

(Continued)

*Primary Examiner*—Shuwang Liu
*Assistant Examiner*—Hirdepal Singh
(74) *Attorney, Agent, or Firm*—Jimmy L. Funke

(57) ABSTRACT

A system for receiving a satellite digital radio signal, the system comprising: a repeater having a unibody housing and an antenna disposed within the housing, the antenna being configured for receiving the satellite digital radio signal; a repeater circuit for receiving the satellite digital radio signal of the antenna, the repeater circuit being configured to condition and re-transmit the satellite digital radio signal as a first signal containing audio data capable of being transmitted through electrical wiring; a satellite digital radio signal receiver having a receiver circuit being configured to receive the first signal; and wherein the receiver circuit receives the first signal from a power cable of the satellite digital radio signal receiver.

25 Claims, 9 Drawing Sheets

U.S. PATENT DOCUMENTS

| | | | |
|---|---|---|---|
| 6,100,847 A | 8/2000 | Sointula | 343/702 |
| 6,160,512 A | 12/2000 | Desclos et al. | 343/700 |
| 6,246,868 B1 * | 6/2001 | Bullock et al. | 455/402 |
| 6,281,852 B1 | 8/2001 | Amarillas | 343/725 |
| 6,295,033 B1 | 9/2001 | Chatzipetros et al. | 343/713 |
| 6,320,549 B1 | 11/2001 | Nybeck et al. | 343/727 |
| 6,329,954 B1 | 12/2001 | Fuchs et al. | 343/725 |
| 6,510,317 B1 * | 1/2003 | Marko et al. | 455/428 |
| 6,538,609 B2 | 3/2003 | Nguyen et al. | 343/713 |
| 6,538,611 B2 | 3/2003 | Noro | 343/725 |
| 6,549,774 B1 | 4/2003 | Titlebaum et al. | 455/427 |
| 6,553,077 B2 | 4/2003 | Rindsberg et al. | 375/260 |
| 6,724,827 B1 | 4/2004 | Patsiokas et al. | 375/259 |
| 6,735,416 B1 | 5/2004 | Marko et al. | 455/3.02 |
| 6,785,656 B2 | 8/2004 | Patsiokas et al. | 704/500 |
| 2003/0193434 A1 * | 10/2003 | Daggett et al. | 342/386 |
| 2004/0032373 A1 | 2/2004 | Petros et al. | 343/725 |
| 2004/0234088 A1 * | 11/2004 | McCarty et al. | 381/306 |
| 2005/0184856 A1 * | 8/2005 | Pourchot | 340/5.61 |
| 2005/0200476 A1 * | 9/2005 | Forr et al. | 340/539.13 |
| 2005/0272367 A1 * | 12/2005 | Rodgers et al. | 455/11.1 |
| 2006/0209752 A1 * | 9/2006 | Wijngaarden et al. | 370/328 |

FOREIGN PATENT DOCUMENTS

| | | |
|---|---|---|
| GB | 2 339 969 A | 2/2000 |
| WO | WO 02/097585 A2 | 12/2002 |
| WO | WO 02/099789 A1 | 12/2002 |
| WO | WO 02/100003 A1 | 12/2002 |
| WO | WO 03/013154 A2 | 2/2003 |
| WO | WO 2004/017459 A1 | 2/2004 |

* cited by examiner

WIRELESS HOME REPEATER FOR SATELLITE RADIO PRODUCTS

CROSS REFERENCE TO RELATED APPLICATIONS

This application claims the benefit of U.S. Provisional Application No. 60/638,064 filed Dec. 21, 2004 the contents of which are incorporated herein by reference thereto.

TECHNICAL FIELD

This present invention relates generally to a wireless home repeater more specifically, the present invention relates to a wireless home repeater for satellite radio products.

BACKGROUND

Digital broadcast radio such as the satellite digital audio radio service (SDARS) provides subscribers with high quality media services, even in mobile environments like the automobile. The SDARS system uses one or more satellites to broadcast audio and advanced multimedia programs. The satellite broadcasts can be received directly by subscriber receivers at home, at business locations, or in mobile vehicles. The satellite broadcasts will also be received and retransmitted by terrestrial repeaters to provide improved coverage and availability.

When subscribers want to listen to satellite radio at home with their home kit, the unit must be receiving a signal via an attached antenna secured to the roof of the home or other location in order to receive and play the SDARS signal. Since the antenna cable of the home kit reaches only so far, it may not be possible to receive a signal at every point in the house or other location (e.g., office etc.). Extension cables for the antenna are available, but running extension cables from one room to another may not be feasible or may be undesirable (e.g., running a line from the living room all the way to the basement and other rooms) due to line length limitations (e.g., signal loss) as well as installation limitations.

Accordingly, it is desirable to provide a device that can reproduce or transmit a satellite digital audio radio signal inside of a home or office structure that otherwise would not have a signal available inside the structure unless an external antenna is wired directly to the receiver. In this way it is possible for multiple users to share one antenna.

SUMMARY

Disclosed herein is a system and method for receiving a satellite digital radio signal. In one exemplary embodiment the system comprises: a repeater having a unibody housing and an antenna disposed within the housing, the antenna being configured for receiving the satellite digital radio signal. The repeater further comprises a repeater circuit for receiving the satellite digital radio signal of the antenna, the repeater circuit is configured to condition and re-transmit the satellite digital radio signal as a first signal containing audio data, video, SDARS data and/or other data (e.g., MP3 files) capable of being transmitted through electrical wiring. In particular, the electrical wiring of a home or building. Also provided is a satellite digital radio signal receiver having a receiver circuit that is configured to receive the first signal, wherein the receiver circuit receives the satellite digital radio signal from a power cable of the satellite digital radio signal receiver after the same has been transmitted to or coupled onto a power line via the repeater circuit.

A system for a satellite digital radio signal, the system comprising: a receiver having a unibody housing and an antenna disposed within the housing, the antenna being configured for receiving the satellite digital radio signal; a repeater circuit for receiving the satellite digital radio signal of the antenna, the repeater circuit being configured to condition and re-transmit the satellite digital radio signal as a radio frequency signal containing audio data, video, SDARS data and/or other data; and a satellite digital radio signal receiver having a receiver circuit being configured to receive the radio frequency signal wherein the receiver circuit receives the radio frequency signal from a receiver antenna of the satellite digital radio signal receiver.

A system for receiving a satellite digital radio signal, comprising: a repeater comprising a unibody housing and an antenna disposed within the housing, the antenna being configured for receiving the satellite digital radio signal; a repeater circuit for receiving the satellite digital radio signal of the antenna, the repeater circuit being configured to condition and re-transmit the satellite digital radio signal as either a radio frequency signal at a radio frequency suitable for radio transmission or as a first signal containing audio data, video, SDARS data and/or other data at a frequency suitable for transmission through an AC power plug of the repeater; and a satellite digital radio signal receiver having a receiver circuit being configured to receive the radio frequency signal from a receiver antenna and/or receive the first signal from a power cable of the satellite digital radio signal receiver.

A system for a satellite digital radio signal, the system comprising: a receiver having a unibody housing configured to be coupled to an external antenna, the external antenna being configured to receive the satellite digital radio signal; a repeater circuit for receiving the satellite digital radio signal of the antenna, the repeater circuit being configured to condition and re-transmit the satellite digital radio signal; and a satellite digital radio signal receiver having a receiver circuit being configured to receive and re-condition the radio frequency signal wherein the receiver circuit.

The above-described and other features of the present disclosure will be appreciated and understood by those skilled in the art from the following detailed description, drawings, and appended claims.

DRAWINGS

DESCRIPTION OF EXEMPLARY EMBODIMENTS

Disclosed herein is a wireless repeater more specifically, exemplary embodiments of the present invention relate to a wireless home repeater for satellite radio products. More specifically, a separate signal distributor with a signal down converter is provided wherein the signal distributor comprises an integral antenna or is configured to be coupled to an existing antenna. The signal distributor is provided with a means to retransmit a re-conditioned signal either wirelessly or through an existing electrical line the distributor is receiving power from. A signal receiver with an up converter for reconditioning the re-transmitted signal of the signal distributor to an SDARS receiver is provided wherein a means for receiving and reconditioning the re-transmitted signal, either wirelessly or through an existing electrical line the receiver is receiving power from, is provided.

Accordingly, an aftermarket product designed to redistribute a SDARS signal from either an existing home antenna or an integral antenna of a receiver to an area of the building structure, which may not otherwise have the signal available is provided. In one exemplary embodiment redistribution of the SDARS signal will be accomplished by taking the available S-band signal, down converting it to the ISM frequency band, broadcasting it in the structure, and then up-converting back to the S-band signal. Accordingly, a system is provided with at least a down-converter/transmit module, which is either configured to have an integral antenna or is configured to be coupled to an existing in home SDARS antenna, and an up-converter/receiver module connected to an existing SDARS receiver.

Figure 1:
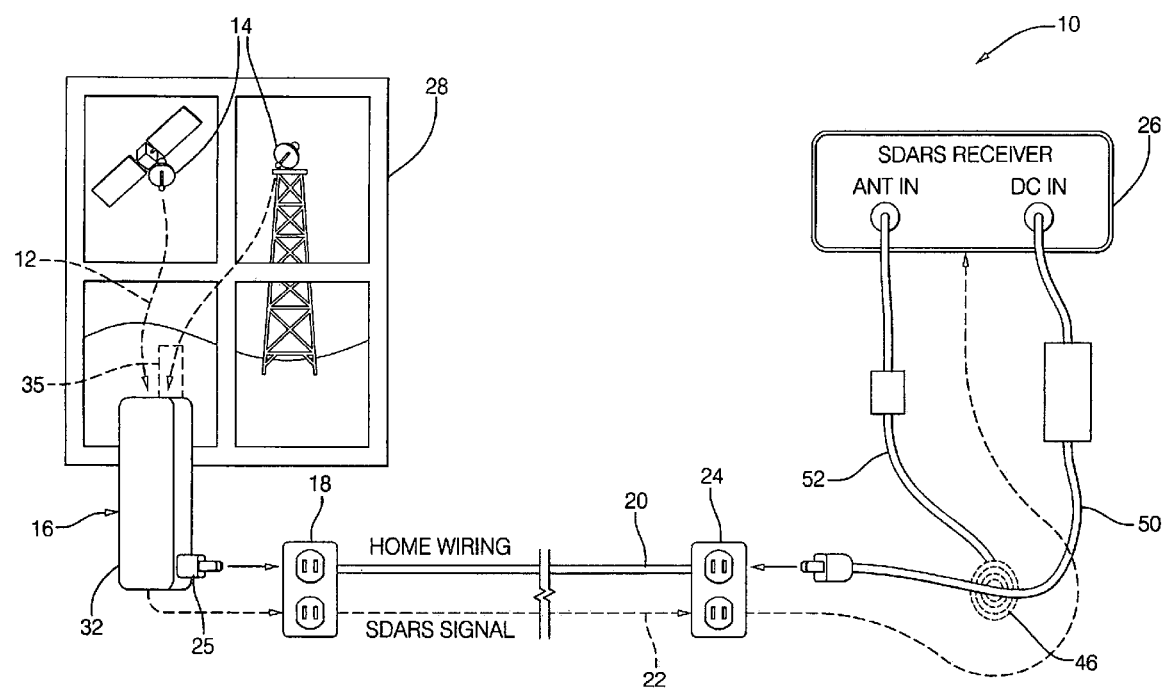
FIG. 1 is an illustration of a wireless home repeater system for satellite radio products in accordance with an exemplary embodiment of the present invention.

Referring now to FIG. 1, a wireless home repeater system 10 in accordance with an exemplary embodiment of the present invention is illustrated. As illustrated in FIG. 1, the system is configured to receive a signal or SDARS signal 12 from a satellite 14. In accordance with an exemplary embodiment a unibody adapter or repeater 16 is configured to plug into an existing AC outlet 18 of a home or building (e.g., office or hotel), wherein existing home or building wiring 20 is used to transmit a received SDARS signal 22 of the unibody adapter to another AC outlet 24 of the home. At this location, an SDARS receiver 26 is plugged in to outlet 24 in order to receive the SDARS signal of the unibody adapter. In an exemplary embodiment, unibody adapter 16 comprises an AC plug 25 on a surface of the unibody housing/adapter.

As shown in FIG. 1 and in accordance with an exemplary embodiment, the unibody housing/adapter is plugged into AC outlet 18, which is proximate to a window 28 that opens to a source or allows source signal passage therethrough, which can be either satellite 14 or a terrestrial source of an SDARS signal (e.g., a terrestrial repeater) or both. Therefore, the antenna of the unibody housing/adapter is easily positioned to be located proximate to a window facing the SDARS signal source in order to receive the same. Accordingly, unibody adapter 16 is positional for receipt of the SDARS signal without requiring extensive work to the home (e.g., drilling of holes and running of antenna or other wires). Moreover, the electronics of the unibody repeater or unibody adapter will also receive its power supply through the AC outlet in addition to using the same as a medium from transmitting the SDARS signal. Thus, the unibody adapter is configured to receive power from the AC outlet employing an AC to DC adapter while also using the AC outlet and its wiring as a means for signal transmission. In one exemplary embodiment and as shown, the housing of the unibody adapter is long enough to extend from outlet 18 to extend partially into the opening defined by window 28. Alternatively and if the wall adjacent to window 28 is very thin the SDARS signal may be received through the wall proximate to the window.

Figure 2:
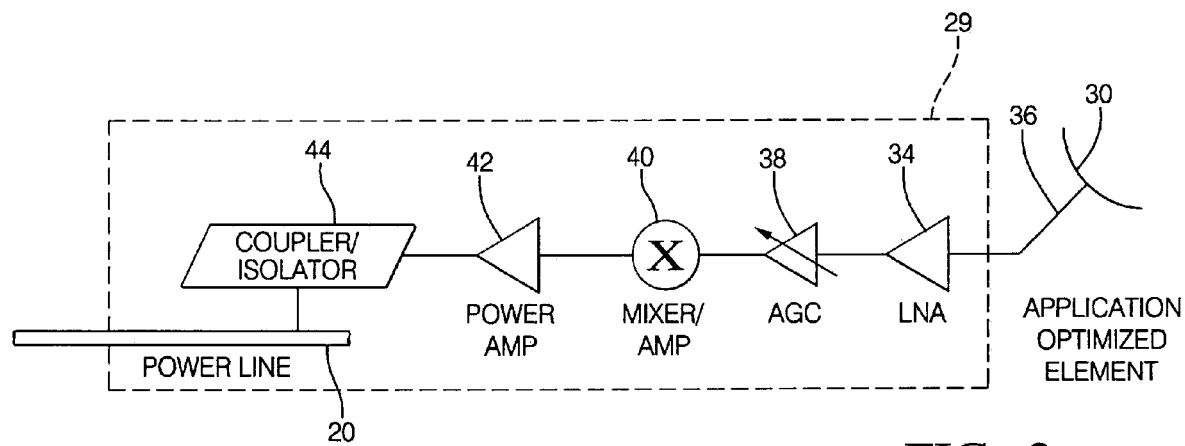
FIG. 2 is a schematic illustration of an adapter repeater coupler of a portion of the FIG. 1 embodiment.

Referring now to FIGS. 1 and 2, a schematic diagram of a repeater circuit 29 of the unibody adapter or repeater electronics is illustrated. As illustrated, schematically an antenna 30 of unibody adapter is located within a housing 32 of unibody adapter 16. In accordance with an exemplary embodiment antenna 30 may comprise a patch antenna or other equivalent structure housed with housing 32. Antenna 30 is configured to receive and provide an SDARS signal to a low noise amplifier (LNA) 34 of the repeater circuit via a conductor 36. The amplified signal of the LNA is then provided to an automatic gain control (AGC) 38, which comprises a device that provides the automatic regulation (electronically) of the gain of the received signal in inverse proportion to the received signal strength. This allows, within certain limits, the output of the unibody antenna to remain relatively constant over a range of fading signal conditions. The received and regulated SDARS signal of the AGC is then provided to a mixer/amplifier 40, which provides a signal to a power amplifier 42, which provides a signal to a coupler/isolator 44 that sends the received and amplified SDARS signal through power line 20 of the home wiring. The coupler/isolator allows the received and amplified SDARS signal to be transmitted to the wiring of the home as a signal containing audio SDARS while also isolating the adapter SDAR signal path from the unwanted frequency of the home wiring, which is approximately 60 Hz due to the alternating current (AC) being supplied to the home wiring. In addition, the coupler/isolator also allows the necessary power to be transmitted to the receiver/power circuit of the repeater.

In an alternative exemplary embodiment and as illustrated by the dashed lines in FIG. 1, the unibody adapter is configured to have a telescoping portion 35 that is extendable and retractable from unibody housing 32. In this embodiment, telescoping portion 35 is connected to or comprises a portion of antenna 30 through power amplifier 42.

In an exemplary embodiment, the SDARS signal is stepped down by the receiver circuit to a frequency suitable for optimum transmission through power line 20 using electronic circuitry known to those skilled in the related arts. In an exemplary embodiment a frequency of 20 MHz has been shown to have desirable results. Other non-limiting exemplary frequencies are found in the range defined by 4-21 MHz. Of course, frequencies greater than or less than 20 MHz are contemplated to be within the scope of the present invention. Moreover, the usage of such frequencies is regulated by the Federal Communications Commission (FCC) in particular licensed frequencies for re-broadcasting.

Figure 3:
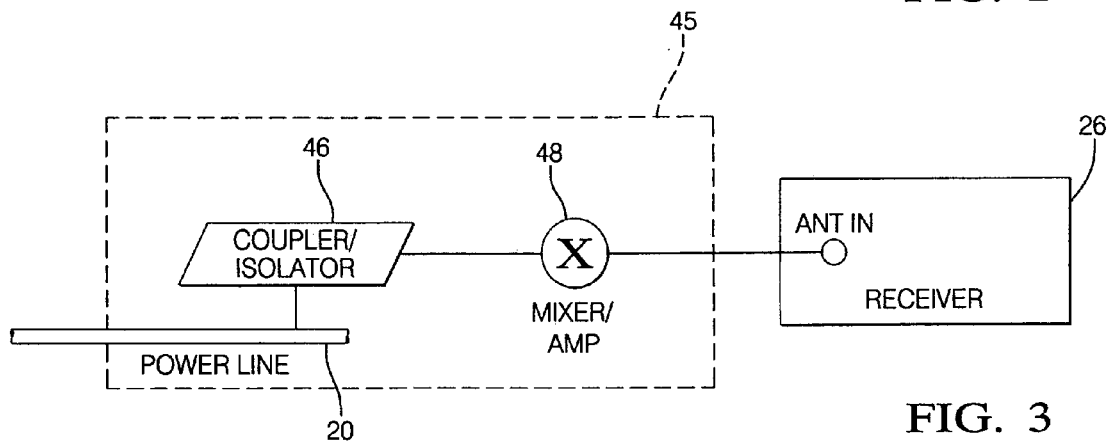
FIG. 3 is a schematic illustration of a receiver-in-home wiring signal coupler circuit of a portion of the FIG. 1 embodiment.

Referring now to FIGS. 1-3 and in particular FIG. 3, a schematic diagram of the SDARS receiver of system 10 is illustrated. As illustrated receiver 26 has a receiver circuit 45, having a coupler/isolator 46 configured to pick up the SDARS signal being transmitted through power line 20 by unibody adapter 16. Again, the coupler/isolator 46 is configured to block unwanted frequencies of the home wiring. Here the picked up signal is received by a mixer/amplifier 48 through coupler 46 and provided to the receiver 26 wherein the signal is reconditioned using electronic circuitry known to those skilled in the related arts to provide a signal suitable for transmission by the SDARS receiver. In accordance with an exemplary embodiment, the receiver is plugged into an outlet 24 via a power adapter (e.g., AC/DC converter) 50. The power adapter 50 is configured to provide a direct current (DC) to the receiver.

In an exemplary embodiment power adapter 50 is also configured to have an antenna 52 coupled to the AC to DC power adapter 50 in order to receive the SDARS signal being transmitted through the power line 20. The operation of the receiver is similar to current SDARS receivers, namely the playing of the received signal however, the method of receipt is unique in that antenna 52 is configured to pick up the signal from the power line of power adapter 50 coupled to the home wiring. Thus, the receiver circuit 45 is configured to pick up the re-transmitted signal at a frequency that is capable of being transmitted through the electrical wiring of the building (e.g., 20 Mhz) while the AC current of the home wiring is converted to DC for powering of the SDARS receiver.

Figure 9A:
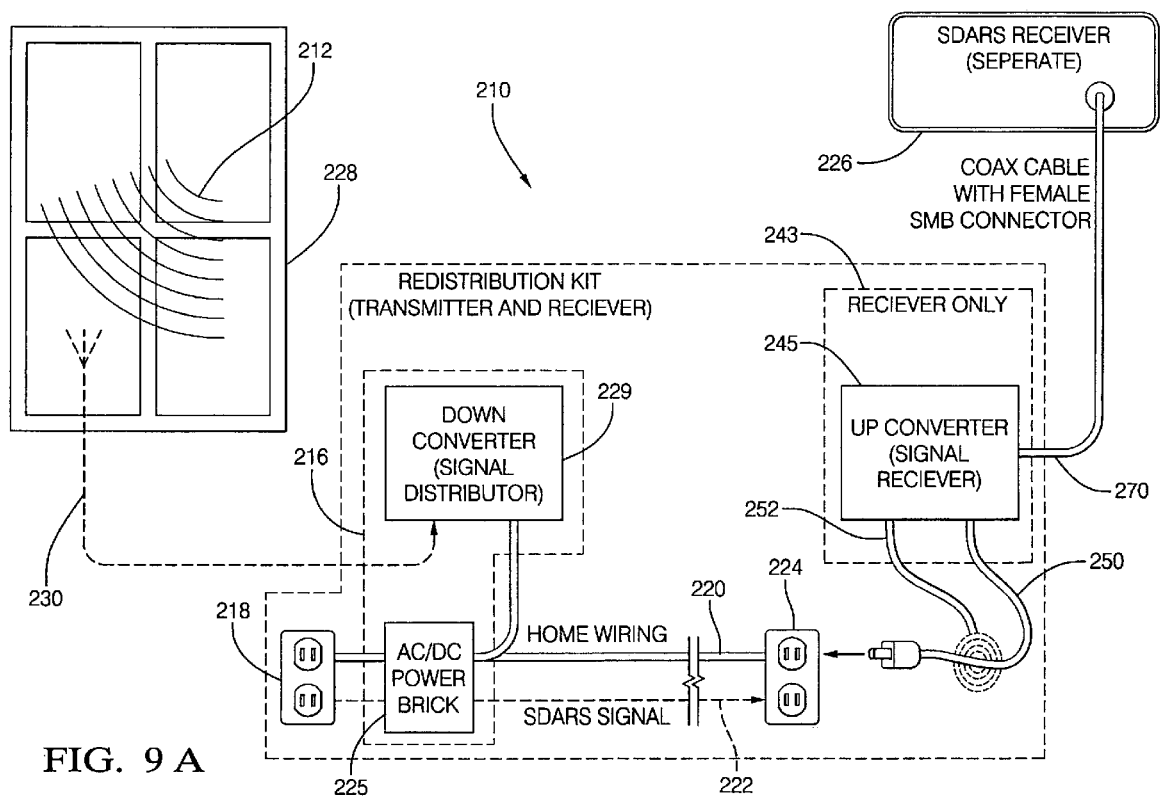
FIGS. 9A-9B are illustrations of wireless home repeater systems for satellite radio products in accordance with other exemplary embodiments of the present invention.
Figure 9:
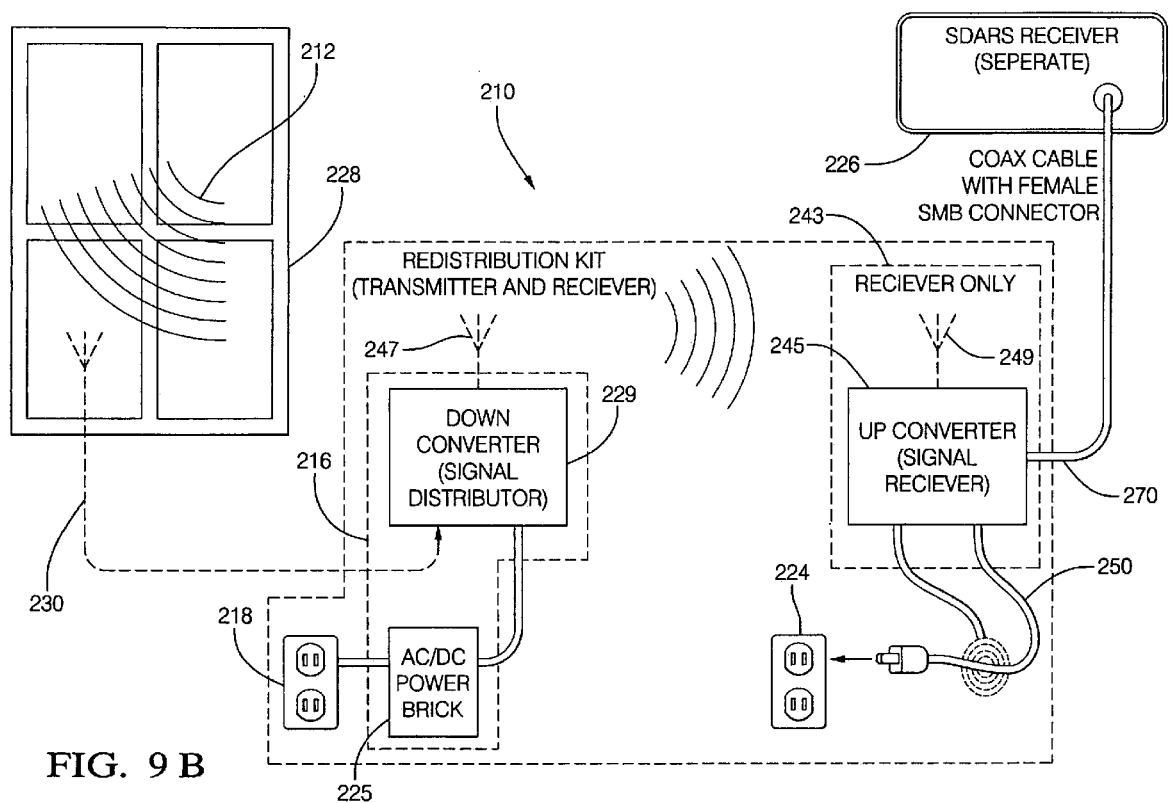
Figure 10:
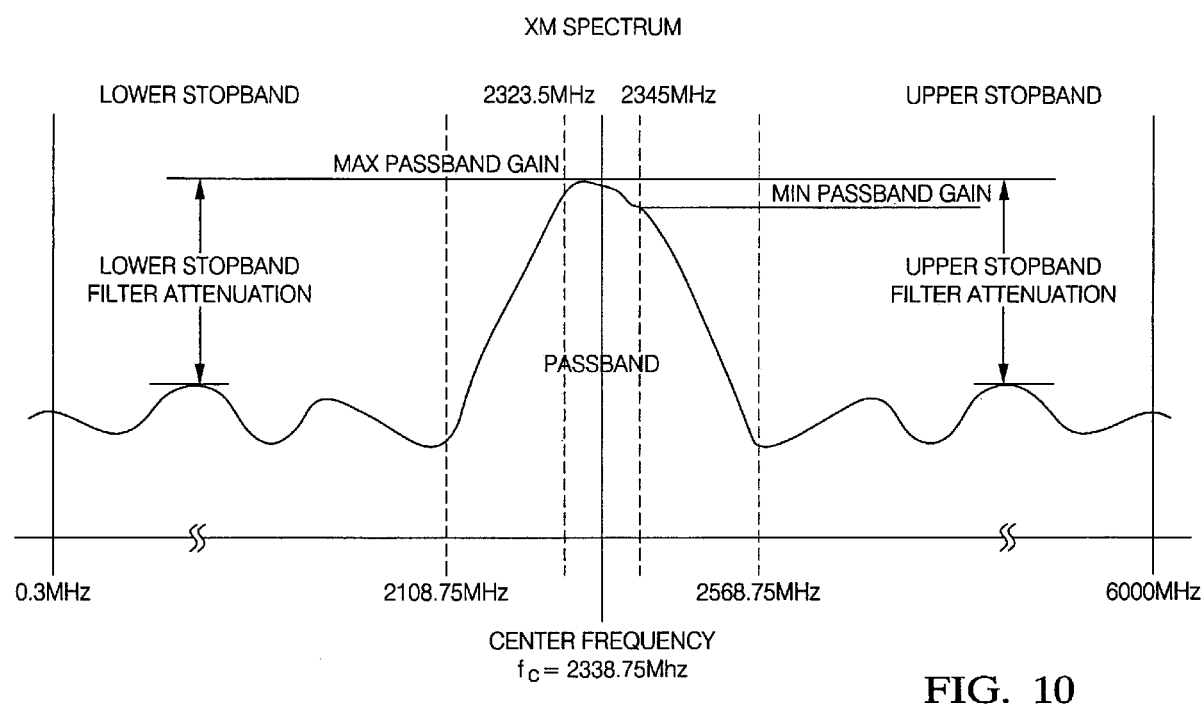
FIG. 10 illustrates examples of the SDARS signal spectrum.
Figure 11:
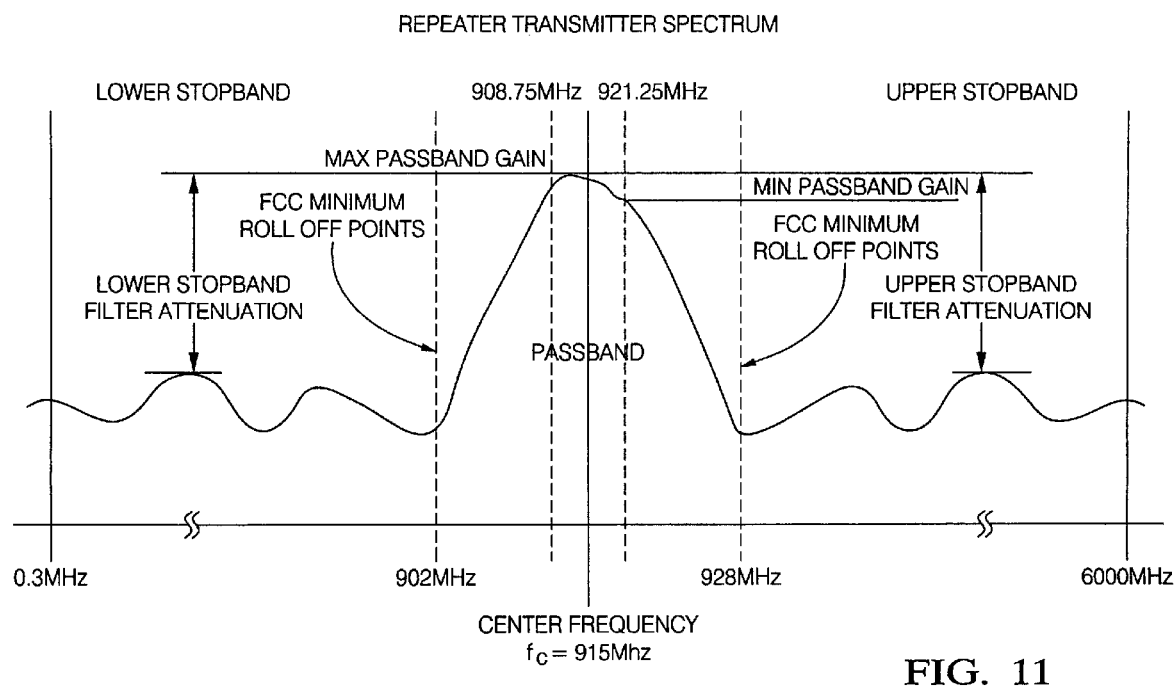
FIG. 11 illustrates examples of the repeater signal spectrum for wireless re-transmission.

In addition, and although not specifically shown in FIGS. 1-3 it is also contemplated that receiver circuit 45 may be a separate item coupled to the SDARS receiver by a cable 70 see for example FIG. 9A. Thus, exemplary embodiments of the present invention allow synergy with an existing home receiver kit already purchased by a consumer, wherein the existing kit comprises an external antenna 30 and SDARS receiver 26. Thus, the signal distributor with a signal down converter and the signal receiver with an up converter for reconditioning the re-transmitted signal of the signal distributor are able to be interposed between the external antenna and SDARS receiver connection in order to provide extended signal distribution not previously provided.

Accordingly, the repeater system operates as follows. First an SDARS signal is received by the unique "unibody" adapter from either a satellite or a terrestrial repeater, the unibody adapter, when placed in a window facing the signal source, allows reception of the signal without external antenna or an AC power cord, since the unibody adapter is configured to have an on-body power plug. The "unibody" should have enough length from the AC outlet to the window or thin wall for its outside receiving antenna to receive adequate signal from the SDAR outside source. Then the SDARS signal (2.3 GHz) is converted by the receiver circuit into a potentially different frequency (although could be same frequency depending on FCC requirements) that can be transmitted across the existing power lines in the house. Once converted, if necessary, the received frequency is then sent out through the outlet in which the adapter is plugged into. This new or additional signal will now be available at other outlets in the home.

Accordingly, and when a DC input of an AC to DC power adapter of a home kit/boom box is plugged into another outlet in the home or office, the coupler of the receiver is attached to a line of the receiver's "Antenna IN" input and the receiver will pick up the radio frequency (RF) signal emitted from the input line of the AC to DC power converter. This signal is then run through an amplifier (and frequency converter if necessary) of the receiver circuit to restore the signal back to its original 2.3 GHz SDARS signal. Thus, the receiver can now pick up the signal just as it would if it were physically connected to an antenna of the unibody adapter.

In an alternative exemplary embodiment, the telescopic section of the unibody apparatus, allows a degree of flexible movement for the module's receiving antenna to move it closer to a window or improved local signal condition. In addition, and in yet another alternative embodiment, the rebroadcast module could include an embedded extension such as a telescopic section to allow flexibility for the module's receiving antenna to move closer to the window and or improved signal condition from the outside source.

Figure 4:
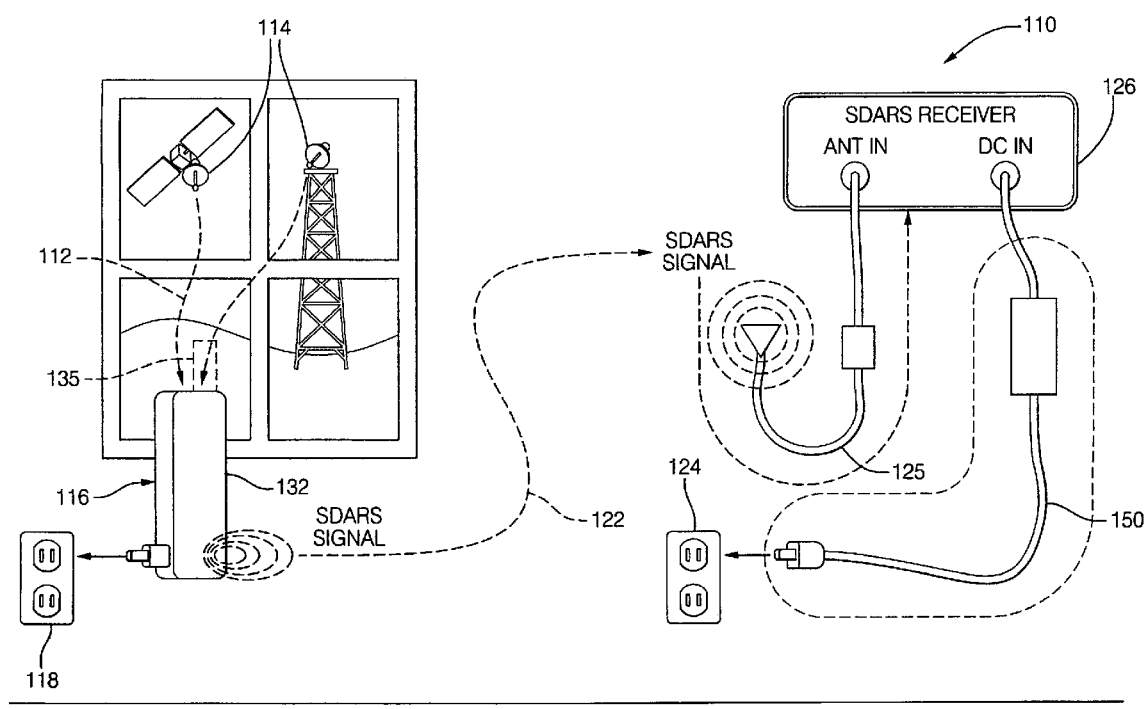
FIG. 4 is an illustration of a wireless home repeater system for satellite radio products in accordance with another exemplary embodiment of the present invention.

Referring now to FIG. 4, an alternative exemplary embodiment of a wireless home repeater system is illustrated. Here component parts performing similar or analogous functions are numbered in multiples of 100. As illustrated, system 110 is configured to receive a signal or SDARS signal 112 from a satellite 114. In accordance with an exemplary embodiment a unibody adapter or repeater 116 is configured to plug into an existing AC outlet 118 of a home, wherein the unibody adapter or repeater is configured to rebroadcast or retransmit the received SDARS signal 122 of the unibody antenna to an antenna 125 of an SDARS receiver 126.

As shown in FIG. 4 and in accordance with an exemplary embodiment, the unibody adapter is plugged into AC outlet 118, which is proximate to a window 128 that faces a source, which can be either satellite 114 or a terrestrial source of an SDARS signal (e.g., a terrestrial repeater). Therefore, the antenna of the unibody adapter or repeater is easily positioned to be located proximate to a window facing the SDARS signal source in order to receive the same. Accordingly, unibody adapter or repeater 116 is positional for receipt of the SDARS signal without requiring extensive work to the home (e.g., drilling of holes and running of antenna or other wires). Moreover, the electronics of the unibody adapter will also receive its power supply through the AC outlet. In one exemplary embodiment, the housing of the unibody adapter is long enough to extend from outlet 118 to extend partially into the opening defined by window 128. Alternatively and if the wall adjacent to window 128 is very thin the SDARS signal may be received through the wall proximate to the window.

Figure 5:
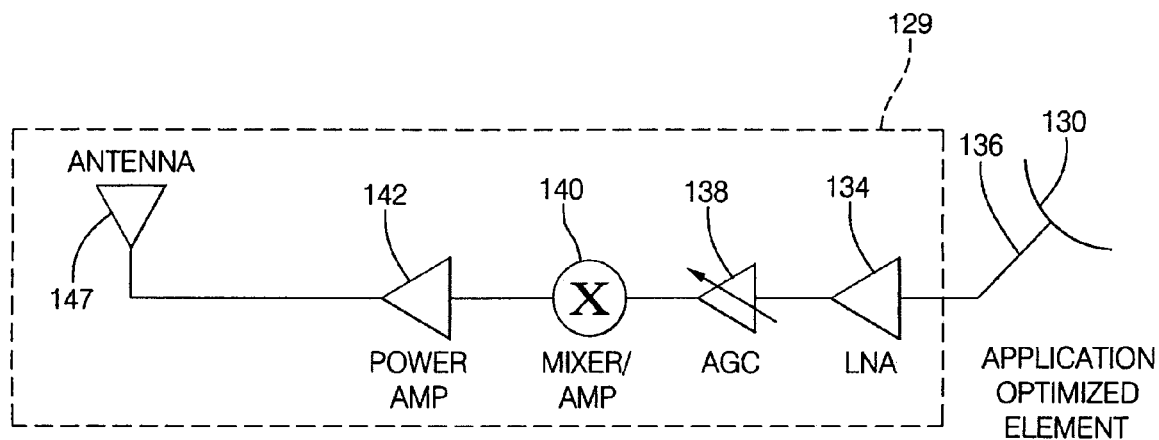
FIG. 5 is a schematic illustration of an adapter repeater coupler of a portion of the FIG. 4 embodiment.
Figure 6:
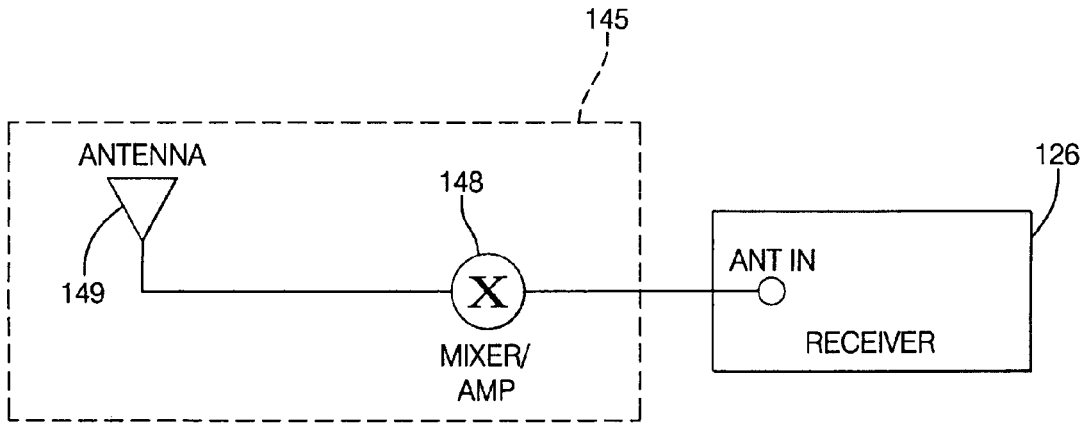
FIG. 6 is a schematic illustration of a receiver-in-home wiring signal coupler circuit of a portion of the FIG. 4 embodiment.

Referring now to FIGS. 5 and 6, a schematic diagram of a repeater circuit 129 of the unibody adapter or repeater is illustrated. As illustrated, an antenna 130 is located within a housing 132 of unibody adapter 116. In accordance with an exemplary embodiment antenna 130 may comprise a patch antenna or other equivalent structure housed with housing 132. Antenna 130 is configured to receive and provide an SDARS signal to a low noise amplifier (LNA) 134 of the repeater circuit via a conductor 136. The amplified signal of the LNA is then provided to an automatic gain control (AGC) 138, which comprises a device that provides the automatic regulation (electronically) of the gain of the received signal in inverse proportion to the received signal strength. This allows, within certain limits, the output of the unibody adapter to remain relatively constant over a range of fading signal conditions. The received and regulated SDARS signal of the AGC is then provided to a mixer/amplifier 140, which provides a signal to a power amplifier 142, which provides a signal to an antenna 147 that sends the received and amplified SDARS signal through the structure in which the unibody adapter is located.

In an alternative exemplary embodiment and as illustrated by the dashed lines in FIG. 4, the unibody adapter/apparatus is configured to have a telescoping portion 135 that is extendable and retractable from unibody housing 132. In this embodiment, telescoping portion 135 is connected to or comprises a portion of antenna 130.

In an exemplary embodiment, the SDARS signal is stepped down to a frequency suitable for optimum transmission through the house or structure in which the unibody antenna is located. In an exemplary embodiment a frequency of 900-915 MHz has been shown to have desirable results of course, frequencies greater than or less than 900-915 MHz are contemplated to be within the scope of the present invention. Moreover, the usage of such frequencies is regulated by the Federal Communications Commission (FCC) in particular licensed frequencies for re-broadcasting.

Referring now to FIGS. 4-6 and in particular FIG. 6, a schematic diagram of the SDARS receiver of system 110 is illustrated. As illustrated receiver 126 has an antenna 149 configured to pick up the SDARS signal being transmitted through the structure or home by unibody adapter/apparatus 116. Here the picked up signal is received by a mixer/amplifier 148 and provided to the receiver 126. In accordance with an exemplary embodiment, the receiver is plugged into an outlet 124 via a power cord 150. The power cord 150 is configured to provide a direct current (DC) to the receiver.

In an exemplary embodiment the receiver circuit is configured to run the received signal through an amplifier (and frequency converter if necessary) of the receiver circuit to restore the signal back to its original 2.3 GHz SDARS signal.

The embodiment of FIGS. 4-6 is similar to that of FIGS. 1-3 but varies in the fact the signal is transmitted completely wirelessly to the receiver's antenna. Here is an example of the operational steps of the embodiment of FIGS. 4-6. First, an SDARS signal is received by the unique "unibody" adapter from either the satellite or a terrestrial repeater. This signal is broadcast at 2.3 GHz. The unibody adapter, when placed in a window facing signal source, allows reception of signal without an external antenna, or an AC power cord. The "unibody" housing should have enough length from the AC outlet to the window or thin wall for its outside receiving antenna to receive adequate signal from the SDAR outside source. Then, the SDARS signal (2.3 GHz) is then converted into a potentially different frequency (900 MHz or could be same frequency) and is broadcasted out into the home from a built-in transmitting antenna 147 in the "unibody" adapter. The new signal is then picked up by the external antenna 149 that is connected to amplifier 148, which would also perform frequency conversion if necessary, which in turn, is connected to the SDARS receiver "Antenna IN" location. In an alternative exemplary embodiment, and in the case of signal transmission without frequency conversion, some implementations may require no external connection of an antenna input in the receiver if signal strength is sufficient. Accordingly, the receiver can now pick up the signal just as it would if it were physically connected to an antenna.

As with the previous embodiments, the rebroadcast module could include an embedded extension such as a telescopic section to allow flexibility for the module's receiving antenna to move closer to the window and/or improved signal condition from the outside source. In yet another alternative embodiment, battery-operated (no AC power connection) personal portable receivers 226 could now work within the building, whereas previously they could not.

Figure 7:
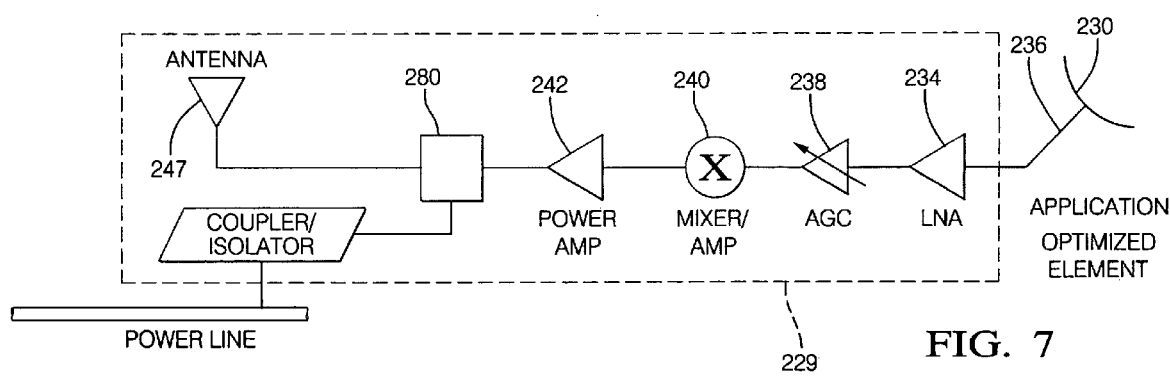
FIGS. 7 and 8 are schematic illustrations of yet another alternative exemplary embodiment of the present invention.
Figure 8:
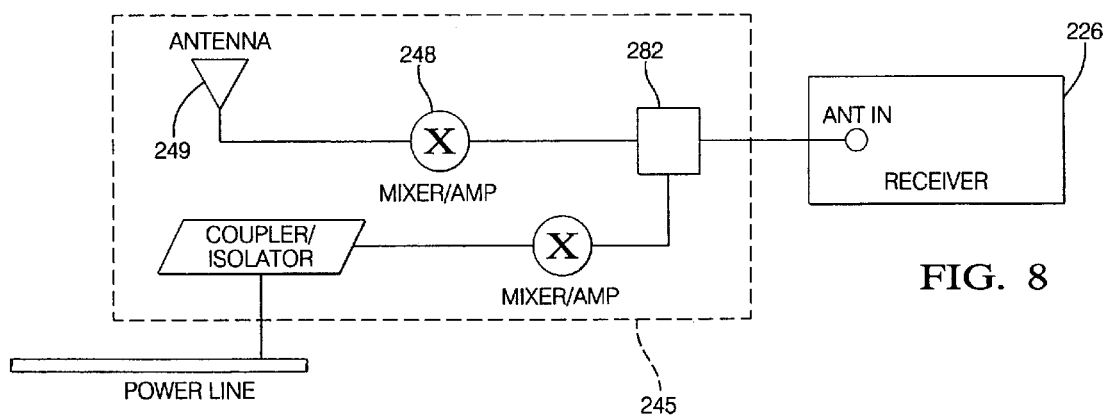

Referring now to FIGS. 7 and 8 and in an alternative exemplary embodiment, the unibody adapter is configured to provide both a satellite digital radio signal through the home wiring and/or a radiated broadcast through antenna 247. In addition, the receiver circuit 245 also comprises a dual mode controller 282, which comprises a comparator or other equivalent electronic circuitry to determine which received signal is stronger (e.g., radiated through the air or through the existing powers lines) and therefore determines which receiving mode or circuit should be used, if both methods are used.

In yet another alternative, the unibody adapter is configured to always operate in a dual mode and the receiver has both an antenna and coupler to receive the radiated broadcast as well as the signal on the power lines and thus, the receiver will automatically receive the strongest signal. In this embodiment, the dual mode controller simply determines and selects the strongest signal.

In yet another alternative exemplary embodiment and referring now to FIGS. 9A and 9B, the unibody adapter does not have an internal antenna and the unibody adapter is configured to be coupled to an existing SDARS antenna 230, which is a separately purchased item or could have been previously purchased by the consumer. A non-limiting example of such an antenna is currently available from Delphi as product number OTZ00245 an antenna for Delphi Models SA10000, SA10001, SA10004 and SA100035 wherein a cable of the antenna is pulled into the unibody adapter 216. Thus, the adapter is plugged into an existing outlet and the antenna with the extension cable is plugged into the unibody adapter providing additional installation options.

As with the previous embodiments, the received signal can be transmitted either wirelessly through an RF signal (FIG. 9B) or alternatively through the electrical wiring of the building (FIG. 9A) or alternatively through both. Also shown in FIGS. 9A and 9B the receiver 226 may be remotely coupled to the receiver of the system via a coaxial cable 270 again providing installation flexibility.

Thus, and referring to the exemplary embodiments of FIGS. 9A and 9B the present invention allow synergy with an existing home receiver kit already purchased by a consumer, wherein the existing kit comprises an external antenna 230 and SDARS receiver 226. Thus, the signal distributor 216 with a signal down converter 229 and the signal receiver 245 with an up converter for reconditioning the re-transmitted signal of the signal distributor are able to be interposed between the external antenna 230 and SDARS receiver 226 connection in order to provide extended signal distribution not previously provided. Thus, exemplary embodiments of the present invention are intended to be compatible with existing SDARS home kits.

In accordance with exemplary embodiments of the present invention, a unibody adapter is provided wherein the unibody adapter comprises a housing for encapsulating the receiver antenna or being configured to be coupled to a separate antenna and the unibody adapter comprises an integral AC power plug. Thus, providing a rebroadcast device in one unit. The unibody adapter with integral antenna eliminates the need for an external antenna and cable, as well as the AC power cord.

In one embodiment the transmission of the SDARS signal is through the home power grid for purposes of providing signal to plugged-in receivers within home or office structure, which would have otherwise not had signal available.

In another embodiment, the transmission of the SDARS signal is radiated wirelessly for purpose of providing signal to either battery-operated or plugged-in receivers within home or office structure, which would have otherwise not had signal available.

In yet another embodiment, the transmission of the SDARS signal is radiated wirelessly or through the home power grid, wherein a dual mode controller determines which mode to operate in.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for receiving a satellite digital radio signal, the system comprising:
   a repeater comprising a unibody housing and an antenna disposed within the housing, the antenna being completely enclosed in the unibody housing, and the antenna being configured for receiving the satellite digital radio signal;
   a repeater circuit completely disposed in the unibody housing, the repeater circuit being configured for receiving the satellite digital radio signal of the antenna to condition and re-transmit the satellite digital radio signal as a first re-transmitted signal containing audio data capable of being transmitted through electrical wiring;
   a satellite digital radio signal receiver separate from the unibody housing and having a receiver circuit being configured to receive the first re-transmitted signal; and
   wherein the receiver circuit receives the first re-transmitted signal from a power cable of the satellite digital radio signal receiver, the power cable being configured to convert AC current to DC current for powering up the receiver circuit, and wherein the satellite digital radio signal for the antenna is received at a frequency of approximately 2.3 GHz and the first re-transmitted signal is transmitted through electrical wiring at a frequency of approximately 20 MHz and is converted back to 2.3 GHz by a mixer in the receiver circuit.

2. The system as in claim 1, wherein the unibody housing further comprises a telescoping portion for extending the effective length of the housing and the antenna.

3. The system as in claim 2, wherein the unibody housing further comprises an AC plug extending directly away from the housing.

4. The system as in claim 3, wherein the repeater circuit further comprises a low noise amplifier, an automatic gain control, a mixer, and an amplifier each being receptive to the satellite digital radio signal as well as conditioning a portion of the satellite digital radio signal for transmission as the first re-transmitted signal to the satellite digital radio signal receiver.

5. The system as in claim 4, wherein the repeater circuit further comprises a coupler/isolator for transmitting the first re-transmitted signal through the AC plug of the housing.

6. The system as in claim 5, wherein the coupler/isolator is configured to isolate wanted signals from signals having a frequency of about 60 Hz.

7. The system as in claim 1, wherein the housing further comprises an AC plug extending directly away from the housing.

8. The system as in claim 1, wherein the repeater circuit further comprises a low noise amplifier, an automatic gain control, a mixer, and an amplifier each being receptive to the satellite digital radio signal as well as conditioning a portion of the satellite digital radio signal for transmission as the first re-transmitted signal to the satellite digital radio signal receiver.

9. The system as in claim 8, wherein the repeater circuit further comprises a coupler for transmitting the first re-transmitted signal through an AC plug of the housing.

10. The system as in claim 9, wherein the first re-transmitted signal is transmitted through the AC plug at a frequency of approximately 20 MHz and the coupler is configured to isolate wanted signals from signals having a frequency of about 60 Hz.

11. A system for a satellite digital radio signal, the system comprising:
   a repeater having a unibody housing and an antenna disposed within the housing, the antenna being completely enclosed in the unibody housing, and the antenna being configured for receiving the satellite digital radio signal;
   a repeater circuit completely disposed in the unibody housing, the repeater circuit being configured for receiving the satellite digital radio signal of the antenna to condition and re-transmit the satellite digital radio signal as a radio frequency signal; and
   a satellite digital radio signal receiver separate from the unibody housing and having a receiver circuit being configured to receive the radio frequency signal wherein the receiver circuit receives the radio frequency signal from a receiver antenna of the satellite digital radio signal receiver, and wherein the satellite digital radio signal is received by the repeater circuit at 2.3 GHz and the radio frequency signal is re-transmitted by the repeater circuit at a frequency in the range of 900-915 MHz and the receiver circuit of the satellite digital radio signal is configured to convert the re-transmitted radio frequency signal back to 2.3 GHz.

12. The system as in claim 11, wherein the housing further comprises a telescoping portion for extending the effective length of the housing and the antenna.

13. The system as in claim 11, wherein the housing further comprises an AC plug extending directly away from the housing.

14. The system as in claim 11, wherein the repeater circuit further comprises a low noise amplifier, an automatic gain control, a mixer, and an amplifier each being receptive to the satellite digital radio signal as well as conditioning a portion of the satellite digital radio signal for re-transmission of the radio frequency signal to the receiver antenna of the satellite digital radio signal receiver.

15. A system for receiving a satellite digital radio signal, comprising:
   a repeater comprising a unibody housing having an antenna disposed within the housing, the antenna being completely enclosed in the unibody housing, and the antenna being configured for receiving the satellite digital radio signal;
   a repeater circuit completely disposed in the unibody housing, the repeater circuit being configured for receiving the satellite digital radio signal of the antenna to condition and re-transmit the satellite digital radio signal as either a radio frequency signal at a radio frequency suitable for radio transmission or as a first signal at a frequency suitable for transmission through an AC power plug of the repeater and the first signal is capable of being transmitted through electrical wiring, wherein the re-transmitted signal contains audio data; and
   a satellite digital radio signal receiver separate from the unibody housing and having a receiver circuit being configured to receive the radio frequency signal from a receiver antenna and receive the first signal from a power cable of the satellite digital radio signal receiver, the power cable being configured to convert AC current to DC current for powering up the receiver circuit, wherein the satellite digital radio signal is received by the repeater circuit at 2.3 GHz and the radio frequency signal is re-transmitted by the repeater circuit at a frequency in the range of 900-915 MHz and the receiver circuit of the satellite digital radio signal is configured to convert the re-transmitted radio frequency signal back to 2.3 GHz.

16. The system as in claim 15, wherein the receiver circuit receives the radio frequency signal in a first mode of operation and the receiver circuit receives the first signal in a second mode of operation and the receiver circuit further comprises a dual mode controller for determining whether the receiver circuit should operate in the first mode of operation or the second mode of operation.

17. The system as in claim 16, wherein the dual mode controller further comprises a control circuit for determining a signal strength of the radio frequency signal and a signal strength of the first signal and the control circuit compares the signal strength of the radio frequency signal and the signal strength of the first signal, and the first mode of operation or the second mode of operation is selected according to the signal strength of the first signal and the signal strength of the radio frequency signal.

18. A system for receiving a satellite digital radio signal, the system comprising:
 a repeater comprising a unibody housing and an antenna, the antenna being completely enclosed in the unibody housing and being configured for receiving the satellite digital radio signal;
 a repeater circuit completely disposed in the housing, the repeater circuit being configured for receiving the satellite digital radio signal of the antenna to condition and re-transmit the satellite digital radio signal as a first re-transmitted signal containing audio data capable of being transmitted through electrical wiring;
 a satellite digital radio signal receiver separate from the unibody housing and having a receiver circuit being configured to receive and re-condition the first re-transmitted signal; and
 wherein the receiver circuit receives the first re-transmitted signal from a power cable of the satellite digital radio signal receiver, the power cable being configured to convert AC current to DC current for powering up the receiver circuit, and wherein the satellite digital radio signal for the antenna is received at a frequency of approximately 2.3 GHz and the first re-transmitted signal is transmitted through electrical wiring at a frequency of approximately 20 MHz and is converted back to 2.3 GHz by a mixer in the receiver circuit.

19. The system as in claim 18, wherein the unibody housing further comprises an AC plug extending directly away from the housing.

20. The system as in claim 19, wherein the repeater circuit further comprises a low noise amplifier, an automatic gain control, a mixer, and an amplifier each being receptive to the satellite digital radio signal as well as conditioning a portion of the satellite digital radio signal for transmission as the first re-transmitted signal to the satellite digital radio signal receiver.

21. The system as in claim 20, wherein the repeater circuit further comprises a coupler for transmitting the first re-transmitted signal through the AC plug of the housing.

22. The system as in claim 18, wherein the receiver circuit is coupled to the satellite digital radio signal receiver by a cable extension allowing the satellite digital radio signal receiver to be remotely positioned with respect to the receiver circuit.

23. A system for a satellite digital radio signal, the system comprising:
 a repeater having a unibody housing and an antenna, the antenna being completely enclosed in the unibody housing and being configured to receive the satellite digital radio signal;
 a repeater circuit completely disposed in the housing, the repeater circuit being configured for receiving the satellite digital radio signal of the antenna to condition and re-transmit the satellite digital radio signal as a radio frequency signal; and
 a satellite digital radio signal receiver separate from the unibody housing and having a receiver circuit being configured to receive and re-condition the radio frequency signal wherein the receiver circuit receives the radio frequency signal from a receiver antenna of the satellite digital radio signal receiver, wherein the satellite digital radio signal is received by the repeater circuit at 2.3 GHz and the radio frequency signal is re-transmitted by the repeater circuit at a frequency in the range of 900-915 MHz and the receiver circuit of the satellite digital radio signal receiver is configured to convert the re-transmitted radio frequency signal back to 2.3 GHz.

24. The system as in claim 23, wherein the repeater circuit further comprises a low noise amplifier, an automatic gain control, a mixer, and an amplifier each being receptive to the satellite digital radio signal as well as conditioning a portion of the satellite digital radio signal for re-transmission of the radio frequency signal to the receiver antenna of the satellite digital radio signal receiver.

25. The system as in claim 23, wherein the receiver circuit is coupled to the satellite digital radio signal receiver by a cable extension allowing the satellite digital radio signal receiver to be remotely positioned with respect to the receiver circuit.

* * * * *